United States Patent
Tunnell et al.

(10) Patent No.: US 10,419,428 B2
(45) Date of Patent: Sep. 17, 2019

(54) SYSTEM AND METHOD TO AUTHENTICATE ELECTRONICS USING ELECTRONIC-METRICS

(71) Applicants: Andrew Tunnell, Palm Bay, FL (US); Sean Powers, Melbourne, FL (US); Jacob Zurasky, Orlando, FL (US); David Tunnell, Palm Bay, FL (US)

(72) Inventors: Andrew Tunnell, Palm Bay, FL (US); Sean Powers, Melbourne, FL (US); Jacob Zurasky, Orlando, FL (US); David Tunnell, Palm Bay, FL (US)

(73) Assignee: NXT-ID, INC., Shelton, CT (US)

( * ) Notice: Subject to any disclaimer, the term of this patent is extended or adjusted under 35 U.S.C. 154(b) by 145 days.

(21) Appl. No.: 15/202,553

(22) Filed: Jul. 5, 2016

(65) Prior Publication Data

US 2017/0006028 A1 Jan. 5, 2017

Related U.S. Application Data

(60) Provisional application No. 62/188,684, filed on Jul. 5, 2015, provisional application No. 62/198,817, filed on Jul. 30, 2015.

(51) Int. Cl.
*H04L 29/06* (2006.01)
*G06Q 20/40* (2012.01)
(Continued)

(52) U.S. Cl.
CPC ....... *H04L 63/0861* (2013.01); *G06Q 20/322* (2013.01); *G06Q 20/40145* (2013.01); *H04L 9/3226* (2013.01); *H04L 9/3234* (2013.01); *H04L 63/06* (2013.01); *H04W 12/06* (2013.01); *H04L 2209/56* (2013.01); *H04W 12/00505* (2019.01); *H04W 12/00508* (2019.01)

(58) Field of Classification Search
CPC ............... H04L 9/3236; H04L 2209/56; H04L 63/0861; H04L 9/3234; H04L 9/3226; H04L 63/06; G06Q 20/40145; G06Q 20/322; H04W 12/06; H04W 12/00505; H04W 12/00508
USPC ....................................................... 713/168
See application file for complete search history.

(56) References Cited

U.S. PATENT DOCUMENTS 6,868,383 B1 * 3/2005 Bangalore .......... G06K 9/00355
704/251
8,639,934 B2 1/2014 Kruglick
(Continued)

FOREIGN PATENT DOCUMENTS

| CA | 2860114 | 6/2013 |
|----|---------|--------|
| CN | 103268436 | 8/2013 |
| EP | 2690850 | 1/2014 |

*Primary Examiner* — Kambiz Zand
*Assistant Examiner* — Aubrey H Wyszynski
(74) *Attorney, Agent, or Firm* — Beusse, Wolter, Sanks & Maire PLLC; John L. DeAngelis

(57) ABSTRACT

A system for authenticating a first entity. The system comprises a storage component for storing a trained electronic-metric factor, a sensor for receiving an electronic-metric input from the first entity, an analysis component associated with a second entity for determining a first relationship between the trained electronic-metric factor and any electronic-metric input, and an authentication component for authenticating the first entity responsive to the first relationship.

20 Claims, 7 Drawing Sheets

Multiple authentication metrics

(51) Int. Cl.
    *G06Q 20/32*       (2012.01)
    *H04W 12/06*      (2009.01)
    *H04L 9/32*        (2006.01)
    *H04W 12/00*      (2009.01)

(56) References Cited

U.S. PATENT DOCUMENTS

| | | |
|---|---|---|
| 8,913,028 B2 | 12/2014 | Chin |
| 9,183,552 B2 * | 11/2015 | Kauniskangas ........ G06Q 20/20 |
| 9,292,731 B2 | 3/2016 | Carrizo |
| 2010/0217685 A1 | 8/2010 | Melcher |
| 2011/0054891 A1 | 3/2011 | Vitte et al. |
| 2011/0251954 A1 | 10/2011 | Chin |
| 2011/0282785 A1 * | 11/2011 | Chin .................. G06F 3/04883 |
| | | 705/42 |
| 2012/0324559 A1 | 12/2012 | Ran |
| 2012/0330833 A1 * | 12/2012 | Aidasani ............ G06Q 20/3223 |
| | | 705/44 |
| 2013/0203350 A1 | 8/2013 | Etchegoyen et al. |
| 2014/0041458 A1 | 2/2014 | Smith |
| 2014/0065566 A1 | 3/2014 | Lai |
| 2014/0300540 A1 * | 10/2014 | Beadle ............... G07C 9/00007 |
| | | 345/156 |
| 2015/0019432 A1 | 1/2015 | Burns |

* cited by examiner

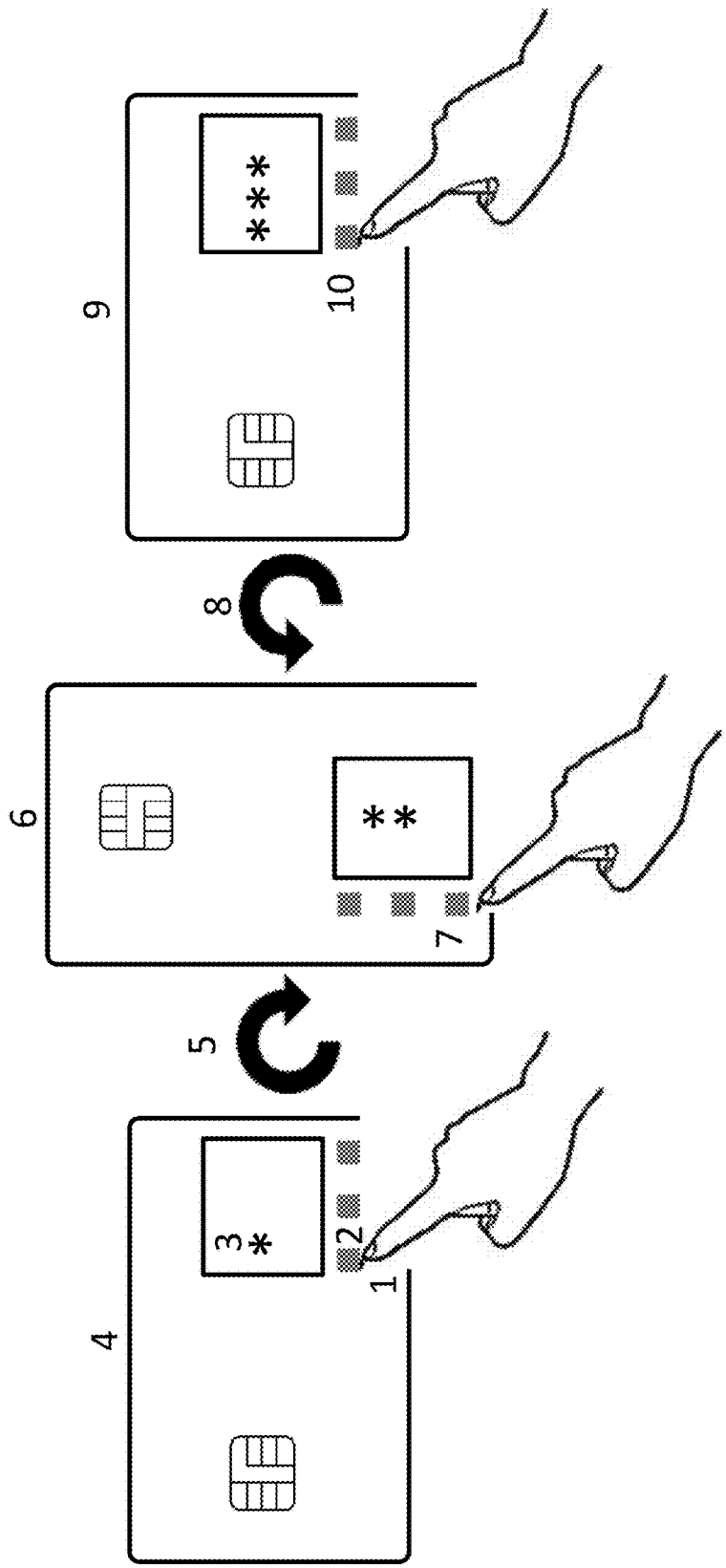
Fig. 1 – Position TAP PIN w/rotation of smart card

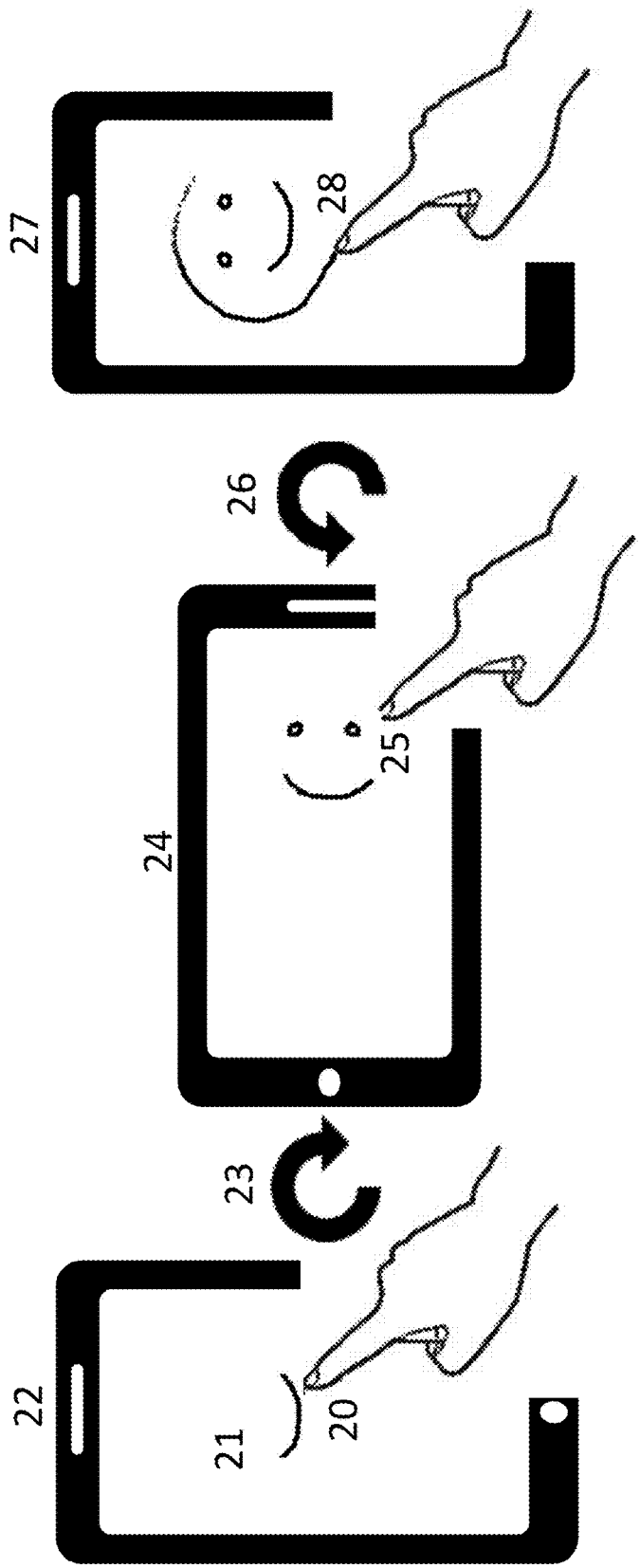
Fig. 2 – Position Pattern on phone

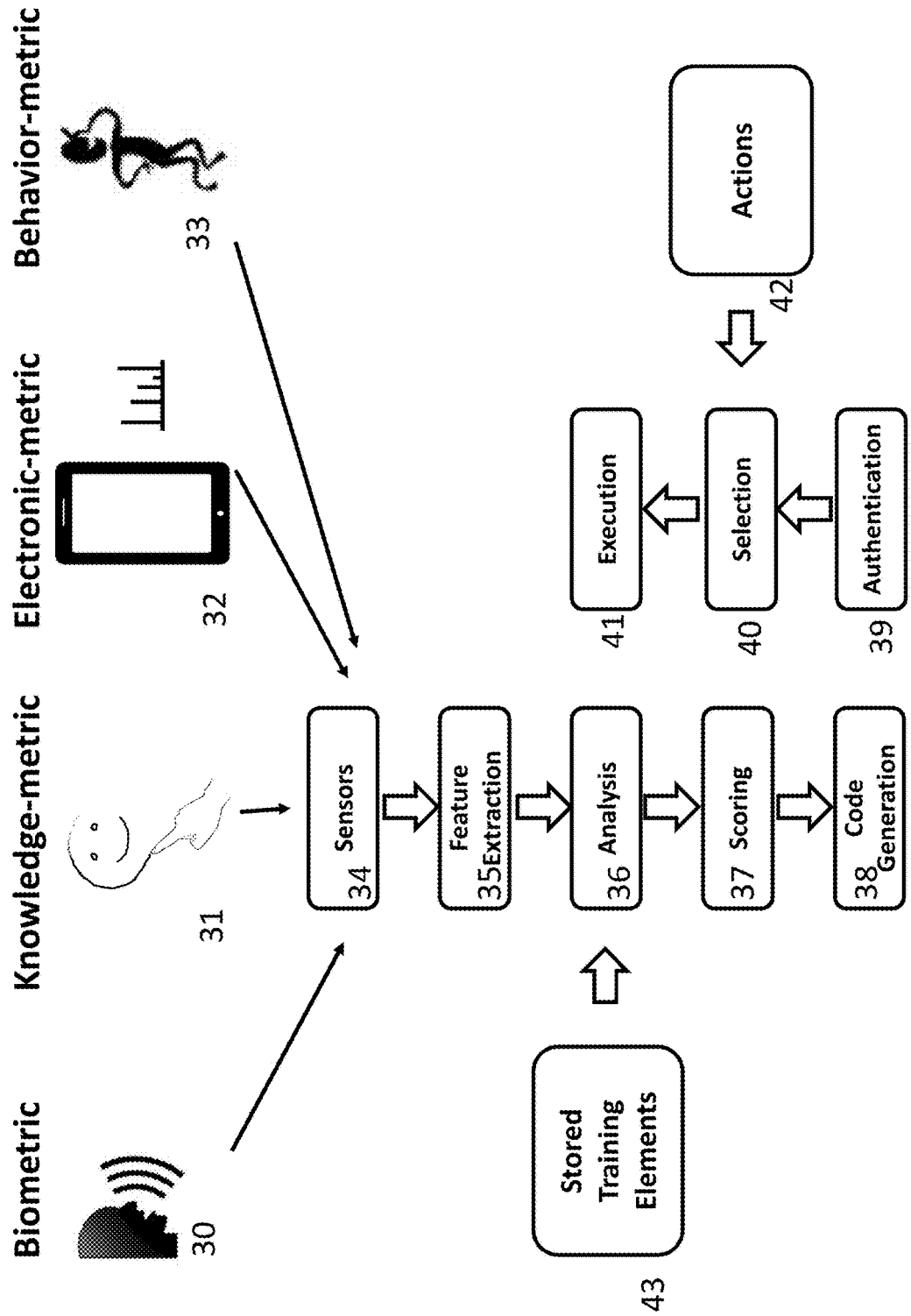
Fig. 3 – Multiple authentication metrics

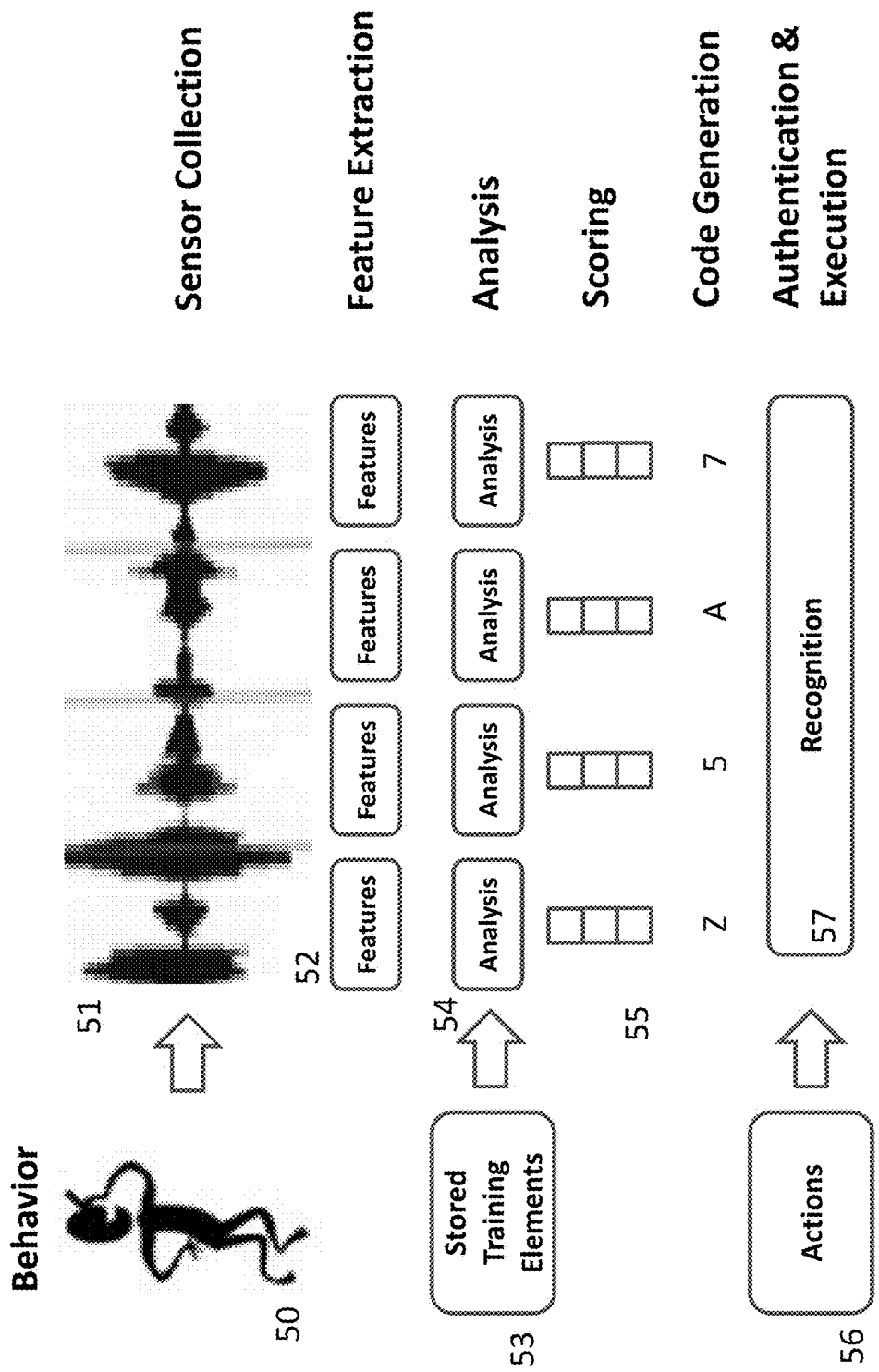
Fig. 4 – Voice recognition and code generation

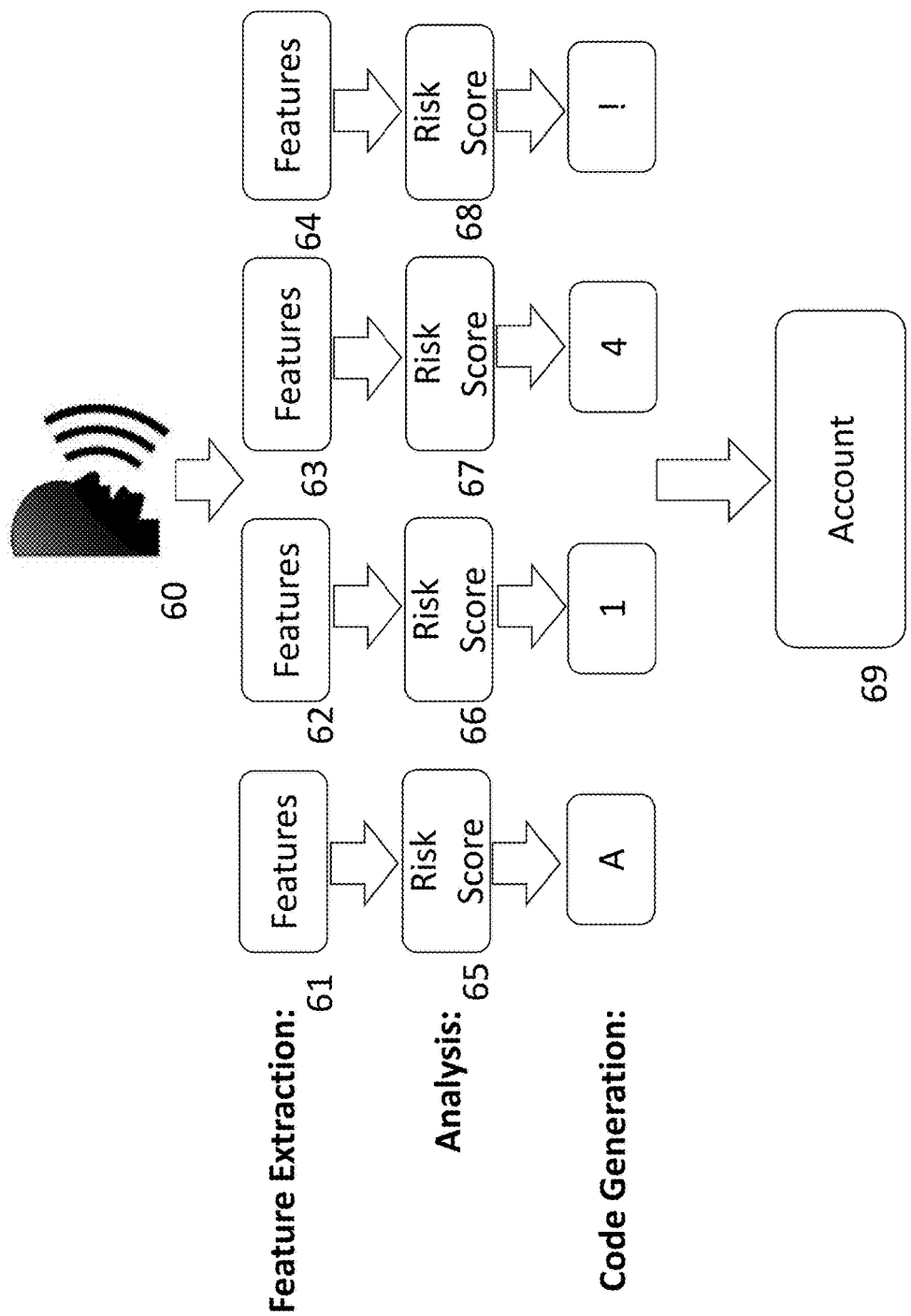
Fig. 5 – Code generation and account selection

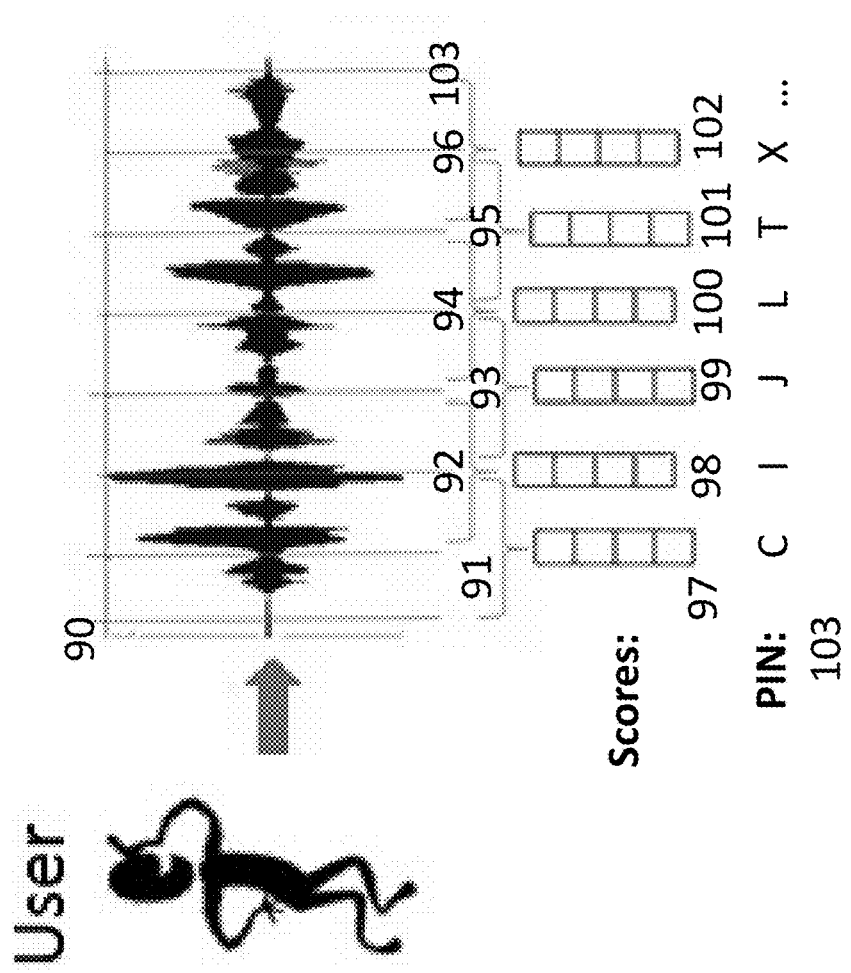
Fig. 6 Voice PIN Segments

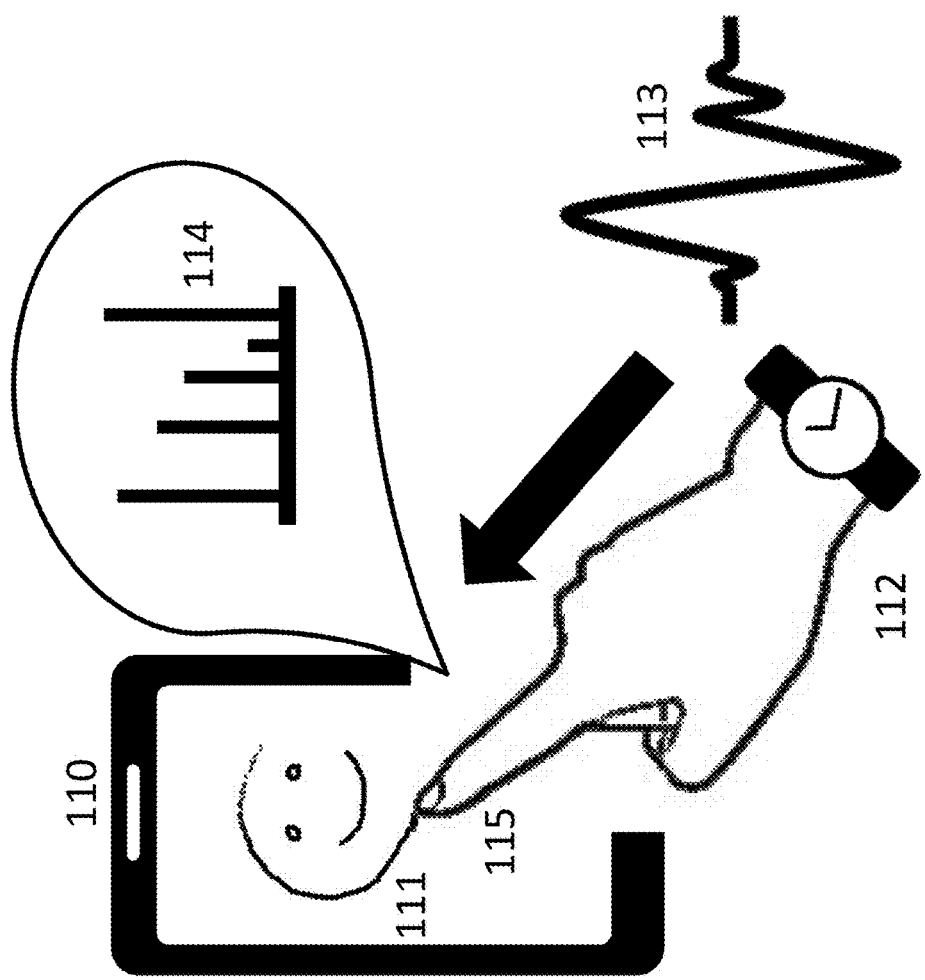
Fig. 7 – Electronic-Metric through finger

SYSTEM AND METHOD TO AUTHENTICATE ELECTRONICS USING ELECTRONIC-METRICS

CROSS-REFERENCE TO RELATED APPLICATIONS

This patent application claims priority to a provisional patent application filed on Jul. 5, 2015 and assigned Application No. 62/188,684, and to a provisional application filed on Jul. 30, 2015 and assigned application No. 62/198,817, both of which are incorporated herein in their entirety.

FIELD OF THE INVENTION

The present invention relates to the general field of authentication and controls, specifically methods and devices to securely authenticate entities, and select and execute actions, controls, transactions, and payments.

BACKGROUND OF THE INVENTION

Most payments today are typically performed by a user selecting a payment method from a wallet. A user generally selects from a plethora of payment cards such as credit, debit, gift, or some other payment means such as trusty cash.

Other more advanced prior art systems and methods of identifying the user as well as authorizing the payment action are known. WIPO published patent application WO 2011163071 is one such method wherein biometric information collected from a user is matched with data stored in a biometric database. A biometric match then authorizes payment to a vending machine specifically.

Applications of this type typically regulate the sale of restricted products such as alcohol to consumers whose biometrics match the required regulatory standards mandatory for purchasing such items at specific locations such as vending machines. Such locations are not typically staffed by a sales person and thus the use of biometrics is necessary.

US published patent application 2011/0282785 describes using a gesture to authenticate a user prior to accessing any payment data for transmission over a near field communication (NFC) link. According to the patent application, a user is required to make a user-defined gesture above a touch sensitive area on a "target" device to gain access to payment or transaction information on a wireless device. Access to the payment or transaction information is authorized if the gesture matches a previously-recorded user-defined gesture. The user can then conduct the payment or transaction using the wireless device.

U.S. Pat. No. 8,913,028 also describes a gesture-based method, but describes a "tactile" force as well to take a mobile device or a non-transitory computing device from a first state to a second state specifically to change an unlocked state or a music playlist.

US published patent application 2014/0064566 authorizes access to payment information from a gesture captured by a camera.

Other prior art such as US published patent application 2015/0019432 utilizes motion of a mobile device to authorize a payment. Prior art of this type typically uses a device to detect a particular gesture through sensors, such as a gyroscope, within the mobile device. A signal representing the gesture is then sent to a passive device using a peer-to-peer connection.

Similarly, Canadian published patent application 2860114 utilizes a device containing gesture-detecting sensors including an accelerometer, a video camera, or a magnetic field sensor. Once a gesture is received from the user on the mobile device, it is sent to a hub.

US published patent application 2014/0300540 describes a mobile device used to capture a user gesture, which is then translated into a coefficient. This gesture is then communicated to a hub either connected to or internal to a given interface. Herein, a gesture is specifically associated with accounts online and over a network, increasing the possibility of an attack.

Similar to US published patent application 2014/0300540, US published patent application 2011/0251954 uses a touch gesture captured on a mobile device to access a specific online financial account to make a payment.

Likewise, US published patent application 2010/0217685 uses a user-based gesture to make a "commerce-related action" in a "networked environment".

In CN 103268436 A, a gesture is used to make a payment at a given payment terminal.

US published patent application 2012/0330833 describes a method wherein a user inputs a gesture which is then used in correlation with an image of the user captured by a camera to identify the user with a specific account that may be used to make a transaction at a terminal including a POS (point of sale) system.

EPO publication 2690850 describes information sent from one device to another with a throwing-like gesture. Herein, when a user wants to send information, he or she will take the first device and make a throwing gesture with that device in the direction of the receiving device.

US issued U.S. Pat. No. 9,292,731 describes a gesture-based signature authentication system and method. A user offers a gesture-based signature that is stored for later use as a template. The user later offers a gesture-based signature for authentication. The later gesture-based signature is compared with the template gesture and if in substantial agreement the stored gesture-based signature is deemed authentic.

US published patent application 2012/0324559 describes a user gesture received by a first device, which extracts features, then translates those features into a token. The token is then sent to a second electronic device, which can either derive another token from the original token, or use the original token. Finally, the secondary electronic device will send the token (either the original or the reproduced) to a server.

WIPO publication 2014/041458 describes a mobile system that is used to make payments in a mobile currency while utilizing a mobile account to generate a barcode containing the payment information. In some embodiments, a gesture "of any body part" is utilized to access a single mobile account.

The prior art references consist of a single biometric or gesture authenticating the user to allow access to data such as financial data or payment data. Some prior art references describe methods to access data to send to a mobile device, hub or remote server to authenticate and execute a payment. Several implementations of said prior art utilize one or more online services to perform authentication and approval for a transaction.

The prior art references consist of the gesture unlocking access to all accounts, but not to a specific account selectable from a multitude of accounts. Such gesture-based prior art describes techniques that simply serve as a "graphical password" to access a device and/or execute payment.

SUMMARY OF THE INVENTION

No known prior art references combine motion or position with other authentication factors. Likewise, no known prior art references utilize behavior to both authenticate a user and identify an action by associating the behavior to a specific account from multiple accounts. Here the behavior of the user (more generally referred to as an entity) selects the account and executes payment, both based on the same user behavior as detected by a device. Prior art references do not disclose any link to a specific account, but instead allow wireless communication of accessed payment data associated with the payment gesture (both singular).

The more difficult challenge is to match multiple biometrics, electronic-metrics, knowledge-metrics and/or behavior-metrics to specific actions from a plethora of actions so that each authentication method performed by a user selects the action as well as authenticates the individual. This challenge is further exacerbated by recognition that authentication methods are not exact. They are based upon statistical modeling that does not result in the creation of specific number that can be matched with databases.

As the number of actions increases, so does the complexity of matching multiple authentications to multiple actions, such as but not limited to selection of payment accounts.

What is needed is a method and related devices to reliably detect and recognize one or multiple biometric and behavior-metrics in a manner that can be consistently compared to multiple cryptographic keys that are then associated with specific data, an account, a transaction, etc. For example, the cryptographic key can be associated with a payment account from among a plurality of payment accounts. The accounts are completely selectable and under the owners full control via a specific behavior performed by the user. These behavioral methods (also referred to herein as behavior metrics) may be executed on a local device or remotely through an online connection.

The present invention enables users to authenticate and or perform a transaction, choose a payment account, alias, crypto-currency, payment amount, communication system, and/or method and/or transaction amount by simply expressing themselves in a specific manner that is associated with an account, an alias to an account or currency, a crypto currency, a payment method, a communications system, or a payment amount, for example.

Under this invention, user behaviors may be associated with specific accounts, purchase selections or parameters, amounts and/or payment methods to facilitate a transaction with the user selected account and/or payment method. Behaviors contemplated by the present invention comprise any position, motion, sound, or other behavior detectable by one or more sensors on one or more devices. The behaviors are performed by a user to a payment account or payment method, such as but not limited to a PIN entered, facial expression, word or sound spoken, gesture, movement, position or pattern drawn or selected.

Accounts may include one or more payment, loyalty, or other account owned by a user, or in some embodiments, an alias that represents an account. Payment methods (also referred to herein as "communications systems" for use in making the payment) may include but are not limited to any one or more of magnetic stripe, wireless magnetic stripe, NFC (near field communication), RFID (radio frequency identification), Bluetooth or BLE (Bluetooth Low Energy), PAN (Private Area Network), WiFi, 3G/4G/LTE, acoustic/sound, light and the like.

In many electronic financial transactions, users frequently identify themselves using a code or a "PIN" (personal identification number). Certain embodiments of the present invention introduce the concept of generating codes or numbers from specific user behavior. In some non-limiting embodiments, these behavior codes are generated from recognition scores and associated to a specific dictionary value (e.g., letter, number, and symbol). The dictionary may also be changed, as in some embodiments. Behavior codes are also referred to as "Behavior PINs" herein.

Behavior PINs (also referred to as behavioral metrics herein) are unique identifiers derived from behaviors that may be recognized by an individual and translated into specific alphanumerical codes by unique scoring or coding techniques. In some embodiments, these codes may also include other authentication factors such as one or more biometrics.

In some embodiments, a PIN entered by a user is recognized to authenticate and/or direct a transaction. Transactions may include access to devices, locations, doors, data, personal information, payment information or the like, or in some embodiments, the authorization to transfer data, currency, and/or units of monetary value from one entity to another entity, entities consisting of any device, server, person, application, software and the like.

In other embodiments, an expression such as a facial expression is translated to an "expression PIN" to authenticate and/or direct a specific account and/or payment method or communications system. In yet another embodiment, a biometric such as voice or sounds are recognized and translated to a "voice PIN" to authenticate and/or direct a transaction. Other embodiments include "gesture PINs" wherein one or more payments are directed from user movement such as but not limited to waving a device in a specific manner. Yet other embodiments include "pattern PINs" wherein specific accounts and/or payment methods are directed by a user drawing a pattern on a device such as but not limited to a touch screen. The "expression PINS" and "pattern PINS" are each a class of "behavioral metrics." The "voice PIN" is a type of "biometric PIN."

For example, FIG. 2 illustrates a user entering a pattern PIN plus orientation of a phone. The user orients the phone vertically 22 and uses their finger 20 to draw the mouth of a smiley face 21. The user then flips the card 23 horizontally 24 and draws the eyes 25. The user then flips the card 26 vertically 27 to complete the drawing of the smiley face 28. The orientation and pattern drawn must match the trained behavior for authentication to succeed.

In all these embodiments, multiple features are extracted to uniquely identify the user as well as the gestures, patterns, expressions, words, sounds or other salient features that may be associated with an account or payment method.

PINs may be generated from risk scores performed on segments or partitions of the detected behavior. When a specific user behavior is detected, feature extraction may be applied to each frame, state, or dimension of the detected behavior. The feature sets are then recognized based on trained behavior and converted into risk scores. For authentication, it is desired to produce the same PIN for different trained user behavior. For example, a user speaking the word "Visa" or drawing the word "Visa" with their finger on an input device would result in the same PIN used for authentication.

In some embodiments of the present invention, Hidden Markov Models (HMM) are used for the statistical modeling of user behavior. The Hidden Markov Model must be first trained with sufficient user data to improve reliable detection. The training procedure dynamically analyzes multiple sets of behavior data to model the behavior and to determine optimal locations and segments of the behaviors. The model further generates a range of acceptable risk scores for each behavior or behavior segment.

Each risk score produced generates appropriate ranges to create the risk score dictionary.

For example, for behaviors that are recognized (that is, matched to a previously-trained behavior) a risk score range is identified. Risk scores within that range indicate that the behavior was recognized. Higher scores within the range indicate a more likely, statistically speaking, match with the trained behavior and lower risk scores within that range indicate a less likely match. In any case, any score within the range is deemed a behavior match. The matching behavior is then translated to a PIN (for example) that comprises characters that are definite and repeatable. The PIN can then unlock crypto methodologies that demand a specific sequence of characters or numbers as an input to access its cryptographic key. Although described in the context of a behavior, these concepts can also be applied to segments of the behavior.

If a risk score or a (risk score range) has already been generated for a different user behavior, the risk score for this different behavior can be adopted or modified to indicate an identical PIN for these two different behaviors. Because of this, the risk score dictionary has rolling definitions and is therefore dynamically changing.

Thus identical PINs can be generated for different behaviors, such as the uttering a specific word and drawing a specific pattern. While both PINs have the same value, they are both generated differently, according to where their risk values were located in the dictionary.

In the case of voice input, voice features are extracted and then processed through the HMM recognizer. The HMM recognizer will produce the behavior recognized (e.g. user has spoken the word "Visa") and the PIN generated (e.g. "1A2!J").

In the case of pattern input on a touch screen, the sequence of touch events are extracted and processed through the HMM recognizer. The HMM recognizer will produce the behavior recognized (e.g. user drew an exclamation mark) and the same PIN generated for the detected voice (e.g. "1A2!J").

In some embodiments, in lieu of a specific risk score, risk score ranges are used to indicate a match between trained behavior and the currently-presented behavior from the entity or user.

Each risk score is interpreted as a given character or code or PIN. The PIN derived from the currently-presented behavior is compared with a recorded or stored PIN to authenticate the user (the person presenting the behavior). In certain embodiments the behavior is matched to fixed, inflexible cryptographic keys within cryptographic components or devices. Generally, each gesture (or other metric input) is scored and stored as a cryptographic value. Each of these cryptographic values can then be stored within an encrypted device or other encrypted component such as an encrypted chip.

In some embodiments of the present invention, a user is able to select a specific biometric factor from among, for example, a gesture, voice, or sound that he or she provides. For example, different metric factors may refer to different payment amounts or to different sub-accounts under a financial account.

BRIEF DESCRIPTION OF THE DRAWINGS

FIG. 1 illustrates a process of authenticating with a tap PIN plus the rotation of the smart card.

FIG. 2 illustrates a process of authenticating with a position pattern plus the rotation of the phone.

FIG. 3 illustrates multiple metrics being used for authentication and code generation.

FIG. 4 illustrates a process of converting a voice input into a PIN.

FIG. 5 illustrates a process for selecting a specific account with a voice PIN.

FIG. 6 illustrates a process of converting a voice print segments into a PIN.

FIG. 7 illustrates a process of authenticating with an electron metric and pattern.

DETAILED DESCRIPTION OF THE PREFERRED EMBODIMENTS

Before describing in detail the particular methods and apparatuses related to user authentication systems and components that provide additional levels of access and security, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments.

The presented embodiments are not intended to define limits as to the structures, elements or methods of the inventions, but only to provide exemplary constructions. The embodiments are permissive rather than mandatory and illustrative rather than exhaustive.

The present invention comprises a system and method to authenticate and/or perform an action or transaction based upon one or combinations of metrics, such as but not limited to knowledge-metrics, biometrics, electronic-metrics and behavior-metrics. Responses to questions, PINs (personal identification numbers), passwords, and patterns all describe "something you know", called "knowledge-metrics" herein. Biometrics capture physiological characteristics that describe "something you are" and behavior-metrics describe "how you behave."

Behavior-metrics defined: Behavior-metrics are defined as analysis or measurements of some behavior performed by one or more entities that can be used to discriminate one or more entities or groups of entities from one or more other entities or groups of entities.

Users, computers, devices, and the like that are able to perform some measurable behavior are collectively called "entities" hereafter. Entities may, in some embodiments, perform some behavior collaboratively, as a group, cluster or plurality of entities, collectively called "collaborative entitles" herein.

Electronic-metrics: In some embodiments, behavior-metrics may be electronic in nature. In the case of electronics, one electronic emission may be distinctive from another electronic emission. Such electronic emissions are called "electronic-metrics" hereafter.

Similar to using biometrics to discriminate "something you are", electronic-metrics may be used to differentiate one electronic device from another electronic device by differentiating "something a device is or "emits".

Discriminating electronic emissions: Non-human entities such as electronic devices typically communicate via some form of electro-magnetic field (EMF) emission such as but not limited to RF (radio frequencies) signals and the like. Electronics also emit distinctive signals that classically do not convey information and therefore are sometimes called "noise". These EMF emissions are distinctive to the circuits that generate them, facilitating recognition (and therefore authentication) of the emitting entity by recognizing the distinctive characteristics of the electronic emission. Under this invention, these distinctive electronic emissions may be used to discriminate one entity from another, and thus authenticate an entity.

Distinctive electronic EMF emissions are low power, detectable in the "near field", close proximity to another device one or more small sensors. Sensors may include small coils, EMF or RF components or antennas such as but not limited to that described in the co-owned patent application Ser. No. 15/089,844 entitled Accordion Antenna Structure, field Apr. 4, 2016.

Received EMF signals may be transformed to the frequency domain via an FFT (Fast Fourier Transform) or equivalent time-to-frequency domain conversion method (which those well versed in the art will recognize). The signal may be moved or "upconverted" or "downconverted" and/or compared with noise to cancel noise that may conflict with the low-level signal. Features may then be extracted from the FFT and characterized using analytical methods including but not limited to Hidden Markov Models (HMM) and the like. The output is then scored and compared to a stored template of a previously trained capture of the EMF from the specific electronic, and if within certain thresholds of the resultant risk score, a "match" is confirmed, and authentication is approved.

In some embodiments, the EMF emitted from one or more electronics may be recognized as a electronic-metric in combination with one or more other authentication methods such as but not limited to biometrics, knowledge-metrics, behavior-metrics and the like. Under certain conditions, one electronic entity may detect and recognize the distinctive EMF emitted from another electronic entity through a user's body as he or she touches both electronics. Thus, under such embodiments, multiple authentication factors may be detected and authentication simultaneous so that the authenticating device knows the other device performing the behavior is indeed from that specific device and not from another electronic possibly attempting to fool the authentication.

Combinations may also be utilized that combine one or more authentication methods and/or factors simultaneously or sequentially. For example, while a user draws a pattern using some device, the EMF signature of a first electronic device that is used to perform the behavior may be detected and transmitted through the user's body to a second electronic device that then recognizes the first electronic device as one factor (electronic-metric) in the authentication process, as well as the pattern (knowledge-metric), fingerprint (biometric) of the individual and the movement (behavior) as the pattern is drawn.

Entity Actions: Behavior-metrics may consist of one or more behaviors, actions, motion, movement, positions, gestures, pressures, directions or any activity that is distinctive to one or more entities, called "behaviors" hereafter. Behaviors can be observed, detected, captured, analyzed, modeled, scored and/or compared, collectively called "user activities or user actions".

These behaviors may be used to differentiate one or more entities from one or more other entities (e.g. authentication, recognition or identification). Authentication is the process of comparing an input to known trained observations. The authentication result will pass if the trained value matches statistically close enough to the input values. Recognition is the process of statistically processing the input into a result that can be used for authentication. Identification is the process of determining who a user is (identify them) by statistically comparing their recognition result with a database of known users.

Inclusion of something you are: In many cases, behavior-metrics may include but are not limited to one or more biometrics (something you are), electronic-metrics (something a device or entity is), or responses/PINs/passwords/patterns/taps (something you know). For instance, one or more entities may emit some sound, words or phrases, collectively called "sounds" herein. Under this non-limiting biometric example, one or more sounds may be observed as a combination of a biometric (who is saying) or electronic-metric (what is saying), the sound (what was said), and/or behavior-metric (how it was said).

Similarly, a PIN (personal identification number) may be entered by one or more entities as another non-limiting example. Both the PIN (something you know) and how the PIN was entered (how you behave) may be recognized as a behavior-metric. Thus, in this embodiment, one entity or entities would be differentiated from another entity or entities by not only the PIN entered, but how the PIN was entered.

Combinations: In another non-limiting knowledge-metric example, sensors used to detect and analyze what is drawn to recognize a gesture, and the same sensors could be used to detect and analyze how it is drawn to recognize behavior. In yet another non-limiting biometric example, a fingerprint may be recognized, while a behavior aspect may also be recognized as the finger draws a pattern.

Sensors: Various types of sensors may be used to detect and capture behaviors. Sensors include but are not limited to optical, infrared, depth, 3D, acoustic, image and other sensors that can capture behaviors. Some sensors could also include touch sensors such as resistive, capacitive, and optical touch screen. In yet other embodiments, touch sensors may be used such as simple pads that can be used for "tap PINs", where authentication is based on which pads are tapped in sequence. Regardless of the sensing technology, one authentication type may be performed in coordination with a behavior-metric as in some non-limiting embodiments, or as in other non-limiting embodiments, using the same sensor technology to perform both authentication types.

FIG. 1 illustrates a non-limiting example of a tap PIN with rotation of the smart card being used for authentication. In FIG. 1, the user orients the card horizontally 4 and taps the first touch button 2 with their finger 1. Then the card is flipped to the right 5 vertically 6 and the third button 7 is tapped. After that the card is flipped back 8 horizontally 9 and the first touch button is tapped 10 again to complete the tap PIN. In another example the card could have been flipped backwards, or at an angle and then a PIN could have been tapped to enter the tap PIN.

Authentication types: This method and system of behavior-metric recognition may be expanded to combinations of biometrics, electronic-metrics, knowledge-metrics, behavior-metrics, collectively called "authentication types" herein, either sequentially, where one method is performed followed by another method, or simultaneously, where a two or more methods may be used simultaneously.

Position PINs: Non-limiting examples of simultaneous authentication methods include "Position PINs", where a device is held in a specific position or orientation while a PIN is entered. In this embodiment, the position or orientation is the behavior that is recognized as the PIN is entered. Under some embodiments, the PIN could be replaced by another authentication type such as but not limited to a biometric such as a fingerprint, face, IRIS, voice, palm, heartbeat or the like. Likewise, the position of the device could be changed prior, during or after an entry of another authentication type.

For a non-limiting example, a face may be held in different positions such as but not limited to moving the face to the right for a period of time, then to up for another period of time, and finally to the left for some period of time. The face may be recognized as a biometric (something you are), but also the position and/or movement may be recognized as a behavior-metric (how the face is moved or for how long it is held in a specific position), as non-limiting examples.

Dynamic authentication: In addition to simultaneous and sequential, authentication methods may be performed dynamically. Dynamic authentication methods include but are not limited to manual selection, requested sequence, and adaptive authentication methods. "Manual selection" comprises selection of one or more authentication methods from a plethora of authentication methods. "Requested sequence" comprises an entity requesting a particular sequence of authentication methods. "Adaptive authentication" comprises authentication methods automatically selected based on environmental and/or device factors. Adaptive authentication methods can lower false negative authentication rates (e.g., users do not fail authentication easily due to unsuitable environments or device factors).

Local, remote and distributed: Authentication methods such as behavioral methods may be executed on a local device or remotely through an online connection, such as but not limited to cloud-based solutions. As a non-limiting example, biometrics, electronic-metrics, knowledge-metrics, behavioral-metrics and the like may be collected or "observed" at a local level, but authentication may be executed "remotely" on one or more servers or devices centralized or distributed in the cloud. Likewise, preferred methods comprise local authentication and/or actions, wherein the user is able to perform these actions through his or her local device. According to this embodiment, authentication methods and/or other actions may be recognized local to a specific device, or distributed over multiple devices across a local or private network, or in some embodiments, across the Internet of Things (IOT) or combinations as described in the co-owned patent application Ser. No. 15/018,496 entitled "Distributed Method and System to Improve Collaborative Services Across Multiple Devices", filed Feb. 8, 2016.

One non-limiting intermediate variation of local authentication and online authentication and selection may entail a situation wherein a user authenticates and/or performs some other action using an intermediate device including but not limited to a POS (point of sale) terminal or a hub. In some embodiments the user may authenticate and select from his or her device as it communicates with the intermediate device. In other embodiments, the user may authenticate and select directly through an intermediate or remote device.

Actions: This method and system of behavior-metric recognition may facilitate many other markets and applications, including authentication, actions, controls, transactions, and the like, collectively called "actions" herein. Herein, one or more specific biometrics, electronic-metrics, knowledge-metrics, behavior-metrics and/or combinations may be associated with one or more specific actions. In some embodiments, an action associated with a behavior-metric is selectable from a plethora of actions via specific behavior performed by one or more entities.

Authentication and controls: Authentication includes but may not be limited to access to devices, computers, locked rooms, doors and the like, as well as sending authentication credentials to access websites, services, applications, software, networks or any other electronic entity and the like. Controls may include but are not limited to environmental, lighting, music, entertainment, gaming, audio volume and the like. As a non-limiting example environmental conditions may include a closed room with a lot of echo preventing reliable voice authentication, or a device not having a microphone to perform voice processing, or a room too dark to capture gesture motions in addition to a device being too under powered to process facial recognition.

Transactions: In some embodiments, authentication methods are associated to specific data that is directed to some transaction. Transactions include but are not limited to payment transactions, where financial data is transferred to a payment processing solution, locally, online, through a private or public network, or within an intermediate platform including but not limited to a point of sale (POS) terminal. Accounts, aliases associated with accounts, amounts, payment communication types, categories, security codes, names, tokens or other non-limiting portions or components of payment information, collective called "payment information" hereafter, may be directed by a user's behavior.

Accounts may include one or more payments, loyalty, or any other accounts owned by a user, or as in some embodiments, an alias that represents an account.

Amounts are one or more metric factors related to an account (a payment amount for example). Such amounts include but are not limited to amounts as defined by a specific number, as well as discounts, or points. Metric factors may also include the amount and type of currency and crypto-currency selected.

Communication systems or communications protocols involved in the payment (or in another type of transaction) include, but are not limited to, methods to transmit data to a magnetic stripe reader (such a dynamic magnetic strip or wireless electromagnetic antenna), "direct contact" methods (including but not limited to a dynamic EMV chip), and/or an inductive coil. Other interfaces or communications systems may include but are not limited to RFID (radio frequency identification), NFC (near field communication), BLE (Bluetooth® low energy), Bluetooth®, Wifi®, PAN (personal area network), 3G standards, 4G standards, Bar code, QR code, sound/acoustic and/or light.

Devices include but are not limited to wearables, portables, mobile devices (e.g., smart wallets), cell phones, tablets, laptops, smart watches, jewelry or PCs (personal computers) and the like. Devices that can be used to select, generate and/or direct payment include but are not limited to smart wallets, cell phones, tablets, smart watches, and/or any other mobile or wearable device, called "mobile devices" herein. Devices that can be used to make payment are called "payment devices" herein.

The present invention supports payment Interfaces over which payment methods such as but not limited to tokens and/or cryptograms may be directed.

Multi-Tokenization: Tokens and/or cryptograms may be generated by a variety of methods including but not limited to local generation such as EMV, HCE (host card emulation), and/or cloud-based tokenization services such as MasterCard, Visa, American Express and the like. Herein, one or more devices may be utilized to select an account, generate and/or transmit a token or cryptogram, and/or direct the payment to a payment interface and/or device. Services that generate tokens and/or cryptograms are called "tokenization services" hereafter.

A user may direct a token using one or more inputs including but not limited to behavior-metrics, electronic-metrics, biometrics, and/or a knowledge-metrics. Herein, behavioral inputs are some action that can be performed that uniquely identifies a user.

In certain embodiments behaviors contemplated by this invention include but are not limited to any motion, sound, voice, words, phrases, touch, facial expressions, PINs, passwords, pattern, drawings, responses to questions, gestures or other behavior detectable by one or more sensors on one or more devices, and/or combinations thereof executed serially or concurrently. The invention is also applicable generally to machine learnable behaviors where a model of the behavior and a risk score dictionary or table associated with the behaviors has been created.

PINs are personal identification numbers that are frequently associated with financial services to authenticate access (something you know). However, under some embodiments of this invention, PINs may also identify an individual and account and/or payment method and/or payment amount by associating the PIN to the user, account and/or payment. In addition, PINs may be referred to as "behavior biometrics" if the way the user enters data, such as with dynamic PIN implementations as described in the co-owned provisional patent application No. 62/198,817 entitled Methods and Systems Related to Multi-Factor, Multi-Dimensional, Hidden Security PINs, filed Jul. 30, 2015.

Facial expressions may include but are not limited to a pose, expressions, blinking rate and number of blinks of the eyes, as well any related changes to the face caused by a user's behavior. For example (non-limiting), purposeful changes to the face may be associated with a specific account, payment amount, and/or payment method, while also serving to recognize (authenticate) the user. Thus, the behavior biometric may be used to direct a payment as well as authenticate the user.

In some embodiments two or more facial expressions, as well as the time between each expression or the duration, speed, or acceleration of each expression may be used in correlation with one another behavior (or singly) to authenticate a user and/or access an account.

Different aspects of a user's facial expression may also be utilized to recognize/authenticate the user as well as select one or more accounts. Such aspects may include but are not limited to poses, the extent to which a user moves a certain part of his or her face or how the user moves his face or a certain part of his or her face. The extent may be measured, in some non-limiting embodiments, by comparing the dimensions of the received input with the dimensions of a previously trained input. In some non-limiting embodiments, the distance between the user's face and the entity receiving the data may be taken into account and used for risk scoring. In yet other embodiments, the speed and/or acceleration of a facial expression may be measured and used to authenticate the user.

Likewise, voice biometrics are unique in that they can convey both identification (something you are) as well as a secret (a word or sound that you know), and in some embodiments, behavior (some way you speak). Herein a sound recognition device as well as any other vibratory sensing device including but not limited to one or more microphones or other sensors that detect sound may be used.

According to certain embodiments, voice or sound expressions may also be utilized for the present invention to enable users to be authenticated while also selecting an account and/or payment method from multiple accounts and/or payment methods.

In some embodiments, different aspects of the sound or voice may be taken into consideration. Such aspects include but are not limited to the pitch of the voice or sound, the frequency of the voice or sound, the speed and/or acceleration with which an entity says or makes a sound, and the intervals of speed during the course of the voice or sound. The intervals of speed are defined herein as the speed with which each dimension of the sound is produced. Dimensions may include but are not limited to the syllables or frames (intervals) of the recorded audio.

Behavior, as in some non-limiting embodiments, may include but is not limited to body movements, finger(s) or hand movements, and/or manual manipulation of devices by the user. These gestures may be detected by motion detecting devices such as but not limited to touch interfaces, acoustic sensors, image, optical or infrared sensors, and/or cameras, as well as device movement or motion detection sensors such as but not limited to accelerometers and gyroscopes.

In some embodiments, parameters including but not limited to speed, acceleration, intervals of speed and/or acceleration/deceleration, and/or direction of movement may be used to differentiate between individuals attempting the same gesture. Thus, movements such as patterns, drawings, gestures and the like are considered behavior biometrics in that they can contain both the identity of a specific user as well the account and/or payment method chosen by the specific user.

For instance, in one non-limiting example a user may draw in space with his or her hand the letters V I S A or G A S to select a specific payment methodology using gesture behavior biometrics (use the VISA credit card to charge the purchase or use the Exxon gas credit card to charge my purchase). Another non-limiting example is to spell 1 5 0 to choose the amount to be paid.

In some non-limiting embodiments, features may not only be extracted from the motion of the body part, but also the physical features of the body part itself. Physical aspects may include but are not limited to the dimensions of the body part being utilized for movement. Dimensions can include but are not limited to the width, length, or circumference of the body part. Other physiological aspects of a body part could include a face, body, arm, hand, or fingerprint.

A non-limiting example of the speed during intervals of the movement may include, but is not limited to, a user making a circular motion with his finger. The speed and/or acceleration of a finger may be consistently different at different portions of the motion throughout the course of the entire motion. These different "intervals of speed" may be used as specific data sources for feature extraction during authentication and/or selection. Of course these "intervals of speed" must have been previously trained by the user to the device that executes the recognition.

Still another method of the present invention utilizes body part movements for authentication as they are applied to a device. According to such embodiments, a user may simply touch or draw a pattern to direct a payment. For the purposes of recognizing a behavior via a touch on a device, devices may be or have internal parts including but not limited to touch screens and/or capacitive, resistive, infrared or other touch detection sensor technologies. In one non-limiting example a user may utilize his or her finger to make a gesture on a touch screen device. Herein different aspects of the user's gesture can be utilized for authentication. These aspects include but are not limited to aspects of motion such as but not limited to the direction of the gesture, the speed of the gesture, the acceleration of the gesture, the pressure of the finger on the receiving device and the direction of the gesture.

Physiological aspects of the body part performing the gesture measured may include but are not limited to the width of the finger, the length of the finger, or the print made by the finger itself. In one non-limiting example, a user may make a gesture with his or her finger in a circular motion on a touch screen device. Different aspects of the gesture will be recorded and used for risk scoring, such as the direction of the motion, the pressure applied to the screen, the speed of his gesture (as a whole and throughout different intervals of the motion), and the finger print that the user made when drawing the circle.

One advantage of these behavior biometrics methods and systems is that they enable accessibility to those that may have some disability such as but not limited to sight impairment. Behavior biometrics also enable users to quickly direct a payment (choose an account, and/or payment method and/or payment amount) by simply performing a behavior that is associated with the specific payment account, payment method and/or amount.

In many electronic financial transactions, users frequently identify themselves using a code or a "PIN" (personal identification number). This invention introduces the concept of generating codes from specific detected behavior. Behavior codes are referred to as "Behavior PINs" herein.

As described herein, behavior PINs are unique identifiers derived from behaviors that are recognized by an individual and translated into specific "codes" by unique scoring methods. Behavior codes may be used to as authentication credentials in some embodiments, or credentials associated with another activity in other embodiments, or combinations of authentication and activity credentials.

In some embodiments, these behavior codes are generated based on recognition scores and may be represented by binary, polynomials, or alphanumerical representations, or in some embodiments, associated with one or more specific numbers, symbols, dictionary letters, or any other non-limiting characters. The dictionary may also be changed, as in some embodiments, to adapt or conform to various forms of alphanumeric representations and/or text.

In some non-limiting embodiments, a PIN entered by a user is recognized to authenticate and direct actions such as but not limited to a payment. In other embodiments, an expression such as a facial expression is translated to an "expression PIN" to direct a specific account and/or payment method. In yet another embodiment, a biometric such as voice or sounds are recognized and translated to a "voice PIN" to direct a payment, direct a specific account and/or payment method and/or payment amount.

Other embodiments include "gesture PINs" where payment is directed based on user movement such as but not limited to waving a device or at a device in a specific manner and "pattern PINs" where specific accounts and/or payment methods directed by a user drawing a pattern on or within proximity of a device such as but not limited to a touch screen. In each of these embodiments, multiple features are extracted to uniquely identify the user as well as the gestures, pattern, expression, word, sound or other salient features that may be associated with an account or payment method.

A more detailed description of the behavior PIN generation method is discussed elsewhere herein. Those experienced in the art will readily recognize the basic concepts of authentication such as feature extraction in the front end and risk scoring in the backend.

With reference to FIG. 5, during training, in the method described herein, one or more features are first extracted from one or more of the separate frames, states, or dimensions of a behavioral input. In the case of FIG. 5, the input is a vocal or audio biometric and four features 61, 62, 63, and 64 are extracted. Generally, the features are extracted during different time intervals of the presented biometric. As a non-limiting example, feature 61 is extracted during a first time interval, feature 62 during a second time interval, feature 63 during a third time interval and feature 64 during a fourth time interval.

After feature extraction, risk scores are then derived for time-based intervals of the behavior. The risk scores associated with the features 61, 62, 63, and 64, are, respectively, risk scores 65, 66, 67, and 68.

Each risk score is then correlated to a character representation of the risk score. In FIG. 5 the character representations comprise "A" "1" "4" "!", respectively, for each risk score 65, 66, 67, and 68. These character representations of the risk scores are herein referred to as "risk score representations, or risk PINs." The characters used for the representations of each risk score can include, but are not limited to, letters, numbers, symbols, pictures or any graphical or alphanumerical characters.

For example, as the input metrics are analyzed, a score is periodically obtained. That score is compared with a range (such as 5+−10). If the score falls within that range its associated character such as 'A' is used. If the score was out of the range it is assigned a different character, such as 'X'. After the scoring is completed, a string of characters have been generated, such as "AH3KL". Each character represents a correlation between the score and a related range.

In the case of voice input, two different users speaking the same utterance generates two different PINs because the periodic scores each will fall within different ranges, thereby generating different scores, such as Speaker 1: "AH3KL" and Speaker 2: "XY9LS".

The assignment of character representations uses a risk score range associated with each character representation. For example, assume a numerical value for the risk score 65 is calculated during scoring of the first interval of the user input. This value falls within a range between XX and YY. The character representation for that range is "A." Each risk score will fall within a designated range and each such range will have an assigned character representation, such as in this example "A".

The result of this process is a character representation including but not limited to a (PIN) personal identification number, e.g., A14! in FIG. 5. Authentication of the user and/or the account and/or the payment amount is achieved by matching the generated PIN with one or more previously recorded or trained PINs. In one embodiment these recorded PINs are stored within a database of PINs.

In some embodiments, an entity will be authenticated and the account will be selected if the PIN exactly matches the PIN that was recorded during training. In other embodiments the PIN required for authentication must be within a range of legitimate PIN values. In embodiments such as these, behaviors can be matched to fixed, inflexible cryptographic keys within cryptographic devices.

In some embodiments, the risk score range associated with a specific character representation may be predetermined.

Other embodiments comprise a technique wherein the risk score range is calculated by means including but not limited to one or more given algorithms. In some other embodiments the risk score range may change as determined by the one or more given algorithms, however still producing the same risk PIN. A dynamic risk score range, for example, as the metric inputs age or change.

One non-limiting example of where the risk score range would change would be with voice recognition of a given phrase or word. For example, after years of a user uttering the same phrase, the risk score dictionary will be dynamically updated to change with the users' voice.

In another example the same utterance may be spoken with various background noises.

Over time the risk score range will be dynamically updated to authenticate the user with the same risk PIN in different environments Yet another example of where a risk score range would change would be with the signature of a user. In both examples, the user may execute the behavior differently over time, thus causing the "movement" or the changing of the risk score range as calculated by the given one or more algorithms.

Under one non-limiting embodiment, every n frames map the current HMM (Hidden Markov Model) network score(s) to a dictionary code. Each code can also be defined as a range of values. Non-limiting examples include A [0-10], B [10-20], C [20-30], etc. In some embodiments the dictionary code can be concatenated with a time salt to obtain a unique hash. The unique hash can then be used as cryptographic device key if authentication is required. In another non-limiting example the processing order of features can be non-sequential to deter attacks between front-end and back-end processing. In this example multiple HMMs can be generated during training and the appropriate HMM selected at time of recognition. In another example, multiple HMMs are scored simultaneously to obtain faster or more reliable recognition results.

Each spoken utterance will provide a consistent code, passcode and/or "PIN". The user that trains the models' PIN can be used as an authentication, or encryption key, or in some embodiments, associated with some other action or activity such as making a transaction. The PIN will depend on the scores of the HMM network(s) and not on the static model values.

Different users speaking the same utterance will result in a different PIN because the runtime scores will differ.

In one non-limiting example of authenticating a user, a user may speak into a mobile device including but not limited to a smart wallet. First, feature extraction will be performed on the voice data received. After feature extraction has been executed, risk scores will be generated from one or more of the given extracted features, frames, states, or dimensions. Each risk score is then translated into or is given one or more character representations, e.g., numbers, letters, symbols, characters or the like. The result is a representation of the voice input received, which may be in the form of a PIN.

In some embodiments of the present invention, the PIN may be stored locally, online, or on a separate device. Local storage as referred to herein may include but is not limited to storage on the user device. Herein the user device may include but is not limited to a cell phone, a smart wallet, a smart watch, a tablet, or any other device. In some non-limiting embodiments the user device may be offline, while in other non-limiting embodiments, it may be connected to a network such as in an online environment. Such devices, as referred to herein, may include but are not limited to any online or offline devices and the like.

In one method of the present invention, a user is able to access specific information elements based on his or her input. This is done by tying a specific character representation to a specific information element. Information elements may include but are not limited to amounts, one or more parts or sub-accounts of a financial account, or any other information elements.

According to the present invention, a user can use a behavior to select one or more amounts to make one or more payments. In some non-limiting embodiments, each amount must below a limit maximum, allowing a user to make payments up to that limit. One non-limiting example would be a user accessing a bank account and making a $100 dollar payment by a waving his hand. The specific hand motion authenticates the user, identifies the bank account, and establishes the amount of $100.

Yet another method of the present invention entails making one or more payments from one or more accounts using one or more user directed behaviors. In a non-limiting embodiment, a user may make a single payment by using a single input to select multiple accounts. However, in other embodiments, a user may use two or more behaviors to access multiple accounts for the purpose of making one or more payments. In yet other embodiments the user may select an amount from one account using one behavior, while using a different input to select another amount either from the same or a different account. In such embodiments, one or more transactions may be executed within any of the selected accounts. The user may also select one or more amounts from those accounts using a single gesture as in some non-limiting embodiments, or one or more gestures as in others.

Yet another method of the present invention entails distributing the feature extraction, behavior detection and/or risk score processing across multiple devices. In one non-limiting embodiment, a user may have a voice model and risk score dictionary stored on a secure device, but the secure device lacks a microphone input. In this example, the user can speak into a separate device that has a microphone (e.g. a mobile phone), that then extracts certain features and wirelessly transmits the extracted features to the secure device. The secure device can then perform the HMM recognition (to direct a specific payment) and generate risk score (to authenticate a user).

In FIG. 5, features 61, 62, 63, and 64 are extracted from a user's voice in a feature extraction unit, risk scores 65, 66, 67 and 68 determined for each feature, and each risk score associated with a PIN value. In this example the PIN value selects an account 69.

FIG. 6 illustrates a user's voice print 90 with identified segments 91, 92, 93, 94, 95, 96, and 103 thereof generating risk scores 97, 98, 99, 100, 101 and 102, that are in turn generate a PIN value 103 for use in selecting an account. Alternatively, the generated PIN value can be used to authenticate the user and/or identify an amount associated with the identified account, as non-limiting examples.

Note that in the FIG. 6 example voice print segments overlap such that seven voice print segments generate six risk scores. This feature is merely exemplary and not required according to the present invention.

Although many of the presented examples relate to user authentication, selecting an account, an amount to be paid (a payment) against the account, and/or methods by which the payment is to be made, these are merely for illustrative purposes only. In various embodiments the biometric, behavioral-metric, electronic-metric, and/or the knowledge-metric may be used to more generally to perform any action, including but not limited to authentication and/or transactions.

Under one method of the present invention, some indication, hereafter referred to as a starting indication, may be required in order for a user to begin the generation process of a code. In one embodiment, a button or other trigger such as a touch For physical behaviors this may include but is not limited to an acceleration limit wherein a specified acceleration of a mobile device or a body part of the user is used to activate a behavior recording. In such embodiments, the recording of a behavior may only begin after the acceleration of the mobile device or body part has equaled or surpassed a specified threshold. As a non-limiting example, a user may quickly jerk his phone or move his ring in a certain direction and then continue to move in a circular motion to make the gesture of a circle. In a similar embodiment, a user may speak a word or a part of a word at an accelerated rate in order to activate a recording of the voice gesture.

In yet another system of the present invention, a user may use a preliminary behavior, or voice gesture in order to "wake-up" or queue the authentication process to indicate the recording of a behavior. Such wake-up methods are based on natural circumstances that may occur when performing an authentication, action, transaction or other activity and the like, called "natural selection" hereafter. Natural selection is used to queue the authentication process in a way that is natural to the user.

As a non-limiting example, a user may draw a 'B' in order to indicate that a behavior needs to be recorded. In yet another non-limiting example, a user may utter a first wake-up word, such as but not limited to the word "record", and then say the correct word or phrase for authentication or control. Those versed in the art will readily recognize that in some embodiments, the preliminary behavior used in both of these examples may be authentic to the entity, thus allowing only the entity to start the recording of a behavior.

A behavior recording session may also begin recording whereupon natural circumstances are recognized. Such circumstances may include but are not limited to movement; position; holding a device in a certain position or moving is a specific direction; holding a body part in a certain position or moving in a specific direction; entering a website; opening an app, network, server or service; request for financial credentials; request for credentials, login, password, PIN, pattern, tap PIN, or the like, or a combination of the previous natural circumstances.

Other natural circumstances may include but are not limited to walking into a certain area or location. Under this embodiment, a device or card may not allow any authentication if an unknown or restricted location is detected. This method prevents a device or card to be used if stolen, or in an unauthorized location.

FIG. 3 illustrates an example of system wherein multiple input metrics are used for authentication. A biometric 30, knowledge-metric 31, electronic-metric 32 or behavior-metric 33 can be used for training models used for user authentication. The training results are stored 43 and used during scoring 37. Different sensors 34 are used depending on the input metric and the corresponding feature extraction 35 is then performed. After feature extraction 35 analysis 36 is performed and risk scores 37 are calculated. The risk score dictionary is used with the scores from 37 to perform code generation 38. The code result from 38 is used for authentication 39. Upon successful authentication the action to be performed is selected 40 from all actions 42 and executed 41.

Certain embodiments of the present invention use an electronic-metric, alone or in combination with other metrics, to perform certain functions such as identifying an action or authenticating an entity. Aspects of such electronic metrics are described below.

Certain embodiments employ time-based reordering of metric (e.g., bio, behavioral, electronic, or knowledge) segments and/or time-based reordering of any one or more of biometric inputs, behavioral-metric inputs, electronic-metric inputs, and knowledge-metric inputs.

Interlacing of metric segments and/or interlacing of any two or more of biometric inputs, behavioral-metric inputs, electronic-metric inputs, and knowledge-metric inputs can also be used to advantage according to the present invention.

Discriminating electronic emissions: Non-human entities such as electronic devices typically communicate via some form of an electro-magnetic field (EMF) emission such as but not limited to RF (radio frequencies) signals and the like. Electronic components also emit distinctive signals that classically do not convey information and therefore are sometimes called "noise". These EMF emissions are distinctive to the circuits that generate them, such as but not limited to switching supplies, clocks, oscillators, RF (radio frequency) and other noise generating components and the like. The present invention facilitates recognition (and therefore authentication) of the emitting entity by recognizing the distinctive characteristics of the electronic emissions. Under this invention, these distinctive electronic emissions may be used to discriminate one entity from another, and thus authenticate an entity.

Distinctive electronic EMF emissions are low power signals, detectable in the "near field" within close proximity to another device via one or more small sensors. Sensors may include small coils, EMF or RF components or antennas such as but not limited to that described in the co-owned patent application assigned application Ser. No. 15/089,844, entitled Accordion Antenna Structure, and filed on Apr. 4, 2016.

Received EMF signals may be transformed to the frequency domain via an FFT (Fast Fourier Transform) or equivalent time-to-frequency domain conversion method (which those well versed in the art will recognize). The signal may be moved or "upconverted" or "downconverted" in frequency and/or compared with noise to cancel noise that may conflict with the low-level signal.

Features may then be extracted from the FFT and characterized using analytical methods including but not limited to Hidden Markov Models (HMM) and the like. Features may include frequencies, modulations, amplitude, pulse widths and the like. A previously trained model of the EMF from the specific electronic is used to score the output, and if within certain thresholds of the resultant risk score, a "match" is confirmed, and authentication is approved.

In some embodiments, the EMF emitted from one or more electronics may be recognized as a electronic-metric in combination with one or more other authentication methods such as but not limited to biometrics, knowledge-metrics, behavior-metrics and the like. Under certain conditions, one electronic entity may detect and recognize the distinctive EMF emitted from another electronic entity through a user's body as he or she touches both electronics. Thus, under such embodiments, multiple authentication factors may be detected and authentication simultaneous so that the authenticating device knows the other device performing the behavior is indeed from that specific device and not from another electronic possibly attempting to fool the authentication.

Combinations may also be utilized that combine one or more authentication methods and/or factors simultaneously. For example, while a user draws a pattern using some device, the EMF signature of a first electronic device that is used to perform the behavior may be detected and transmitted through the user's body to a second electronic device that then recognizes the first electronic device as one factor (electronic-metric) in the authentication process, as well as the pattern (knowledge-metric), fingerprint (biometric) of the individual and the movement (behavior) as the pattern is drawn.

FIG. 7 illustrates one non-limiting example of combining electronic-metrics with other authentication factors to achieve a multi-factor solution. As shown in FIG. 7, a first entity 110 (a smart phone in this non-limiting example) may detect and analyze 114 a distinctive electronic signal 113 emitting from a second entity 112 (a watch in this non-limiting example). The distinctive electronic signal describes the second entity 112 as having distinctive features that aid in recognition of the second entity. Thus, in this non-limiting example, a user may be authenticated by both the electronic-metric from the second device 112 (a watch) while a user 115 wearing the watch 112 draws a pattern 111 to authenticate with a knowledge-metric (the pattern 111), and perhaps also a behavior-metric by detecting the speed and direction of the pattern 111 as it is drawn, and also possibly a biometric by all recognizing the fingerprint as the pattern 111 is drawn. This adds multiple factors to a common knowledge-metric based authentication process of drawing a pattern.

An exemplary system for implementing the various software aspects of the invention includes a computing device or a network of computing devices. In a basic configuration, computing device may include any type of stationary computing device or a mobile computing device. Computing device typically includes at least one processing unit and system memory. Depending on the exact configuration and type of computing device, system memory may be volatile (such as RAM), non-volatile (such as ROM, flash memory, and the like) or some combination of the two. System memory typically includes operating system, one or more applications, and may include program data. Computing device may also have additional features or functionality. For example, computing device may also include additional data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules or other data. System memory, removable storage and non-removable storage are all examples of computer storage media. Non-transitory computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by computing device. Any such computer storage media may be part of device. A computing device may also have input device(s) such as a keyboard, mouse, pen, voice input device, touch input device, etc. Output device(s) such as a display, speakers, printer, etc. may also be included. Computing device also contains communication connection(s) that allow the device to communicate with other computing devices, such as over a network or a wireless network. By way of example, and not limitation, communication connection(s) may include wired media such as a wired network or direct-wired connection, and wireless media such as acoustic, RF, infrared and other wireless media.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or an information processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Biometric inputs as referred to herein may comprise any one or more of a fingerprint, a hand print, a voice input, an audio input, an iris print, voice pitch, dimensions of a body part, facial characteristics, an electrocardiogram, heart rate, and a scent, etc.

Behavioral-metric inputs as referred to herein may comprise any one or more of a pose, a position, a rotation, a hand gesture, a facial expression, a facial position, a facial movement, a body position, an eye blinking rate, a number of eye blinks, a body motion, a vocal utterance, an aural utterance, motion of an object, position of an object, a drawn pattern, a time interval between two behavioral-metric inputs, induced vibrations, duration of a behavioral-metric input, motion speed, motion acceleration, motion velocity, direction of motion, a hand motion, time elapsed during the hand motion, a static gesture, one or more sign language letters or characters, and a rhythmic input, etc.

Electronic-metric inputs as referred to herein may comprise any one or more of an electro-magnetic field, an emission having features distinctive to an electronic device, a noise spectrum as a function of frequency, an amplitude spectrum as a function of frequency, a pulse width, a power level as a function of frequency, emissions generated by a switching circuit.

Knowledge-metric input as referred to herein may comprise any one or more of a password, a personal identification number, a login characters, a response to a question, a tap, and a personal identification number, etc.

Certain aspects of the invention may benefit from the use of dynamic pairing concepts as related to an authentication process, including the concept of "circles of access" among "trusted" entities, as described in the co-owned non-provisional patent application Ser. No. 14/217,289 entitled Universal Authentication and Data Exchange Method, System and Service filed Mar. 17, 2014, which is incorporated herein by reference. The described methods and systems involve growing "trust" among devices that are "inter-aware" of one another through historical interaction and authentication such as but not limited to "Dynamic Pairing" as described in another non-provisional co-owned patent application and assigned application Ser. No. 14/217,202 entitled The Un-Password: Risk Aware End-to-End Multi-factor Authentication via Dynamic Pairing, which is also incorporated herein by reference. According to these inventions, entities increase trust as the history of interaction increases.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims

What is claimed is:

1. A system for authenticating an electronic device and a user of the electronic device, the system comprising:

a receiving component for receiving a biometric, a knowledge metric or a behavior metric from the user;

an analsis component for analying the biometric, the knowledge metric, or the behavior metric and responsive thereto authenticating the user;

a storage component for storing characteristics of a previously trained electronic-metric field emission from the electronic device;

a sensor for receiving a real time electronic-metric field emission from the electronic device; the real time electronic-metric field emission comprising a noise-like emission that does not represent an user-derived information nor originates with the user;

an analysis component for determining a first relationship between the characteristics of the trained electronic-metric field emission and characteristics of the real-time electronic-metric field emission; and an authentication component for authenticating the electronic device responsive to the first relationship.

2. The system of claim 1 the electronic device comprising a first electronic device, wherein the system is disposed within a second electronic device and the electronic-metric emission propagates from the first electronic device to the second electronic device through a human body or a medium in close proximity to the first and second electronic devices.

3. The system of claim 1 wherein a successful authentication executes an action, controls a device, or executes a financial transaction.

4. The system of claim 1 wherein the analysis component comprises a Hidden Markov Model (HMM).

5. The system of claim 1 wherein the electronic-metric field emission comprises an emission spectrum of the electronic device.

6. The system of claim 5 wherein the analysis component analyzes one or more of amplitude as a function of frequency and spectral content in determining the first relationship.

7. The system of claim 1 the storage component further storing at least one of a trained biometric factor, a trained behavior-metric factor, and a trained knowledge-metric factor, the analysis component for determining a second relationship between the trained biometric factor and the biometric, for determining a third relationship between the trained behavior-metric factor and the behavioral-metric input, and for determining a fourth relationship between the trained knowledge-metric factor and the knowledge-metric, the authentication component for authenticating the user and the electronic device responsive to the first, second, third and fourth relationships.

8. The system of claim 7 wherein the electronic-metric field emission is provided concurrently with any one or more of the biometric, the behavior-metric, and the knowledge-metric.

9. The system of claim 1 wherein the electronic-metric field emission comprises an emission spectrum, the sensor further comprising a detection device tuned to one or more frequencies within the emission spectrum, the analysis component determining the first relationship between the one or more frequencies of the trained electronic-emission factor and the one or more frequencies of the electronic-emission.

10. The system of claim 1 wherein the electronic-metric field emission comprises a signal with power disposed over one or more first frequencies, the system further comprising a frequency conversion component for upconverting or downconverting the one or more first frequencies to different one or more second frequencies, the one or more second frequencies input to the analysis component.

11. The system of claim 1 further comprising a frequency-to-time converter responsive to the electronic-metric field emission for converting the electronic-metric emission from a frequency domain signal to a time domain signal, the time domain signal input to the analysis component.

12. The system of claim 11 wherein the frequency-to-time converter comprise a fast Fourier transform.

13. The system of claim 1 further comprising a code-generating component for producing a code responsive to the first relationship, and wherein the authentication component is responsive to the code.

14. The system of claim 13 wherein the code generated by the code-generating component comprises a cryptographically encoded code further comprising any one of a token, a hash, or a dynamic pairing code.

15. The system of claim 13 wherein the code is derived from at least one risk score representing a correlation between the trained electronic-metric emission factor and any electronic-metric emission.

16. The system of claim 1 wherein the electronic-metric field emission comprises EMF emissions and the sensor comprises an antenna or a coil.

17. The system of claim 1 wherein the electronic-metric field emission comprises an RF emission having characteristics related to frequency, modulation, amplitude, and pulse width.

18. The system of claim 1 wherein the electronic device comprises a portable electronics device, a mobile phone, a cell phone, a smart wallet, a smart television, a game console, a tablet computer, a laptop computer, a smart watch, a personal computer, and a wearable item.

19. The system of claim 1 further comprising an identification component for identifying an action responsive to the first relationship.

20. A portable device, a mobile device a smart wallet, a smart television, a game console, a cell phone, a tablet, a laptop, a smart watch, a personal computer, a wearable item, or an on-line device comprising:
    a storage component for storing characteristics of a previously trained electronic-metric field emission from the portable device, from the mobile device, from the smart wallet, from the smart television, from the game console, from the cell phone, from the tablet, from the laptop, from the smart watch, from the personal computer, from the wearable item, or from the on-line device;
    a sensor for receiving a real-time electronic-metric field emission from the portable device, from the mobile device, from the smart wallet, from the smart television, from the game console, from the cell phone, from the tablet, from the laptop, from the smart watch, from the personal computer, from the wearable item, or from the on-line device the real time electronic-metric field emission comprising a noise-like emission that does not represent any user-derived information nor originates with the user;
    an analysis component for determining a first relationship between the characteristics of the trained electronic-metric field emission and characteristics of the real-time electronic-metric field emission; and
    an authentication component for authenticating the portable device, the mobile device, the smart wallet, the smart television, the game console, the cell phone, the tablet, the laptop, the smart watch, the personal computer, the wearable item, or the on-line device responsive to the first relationship.

\* \* \* \* \*